UNITED STATES PATENT OFFICE.

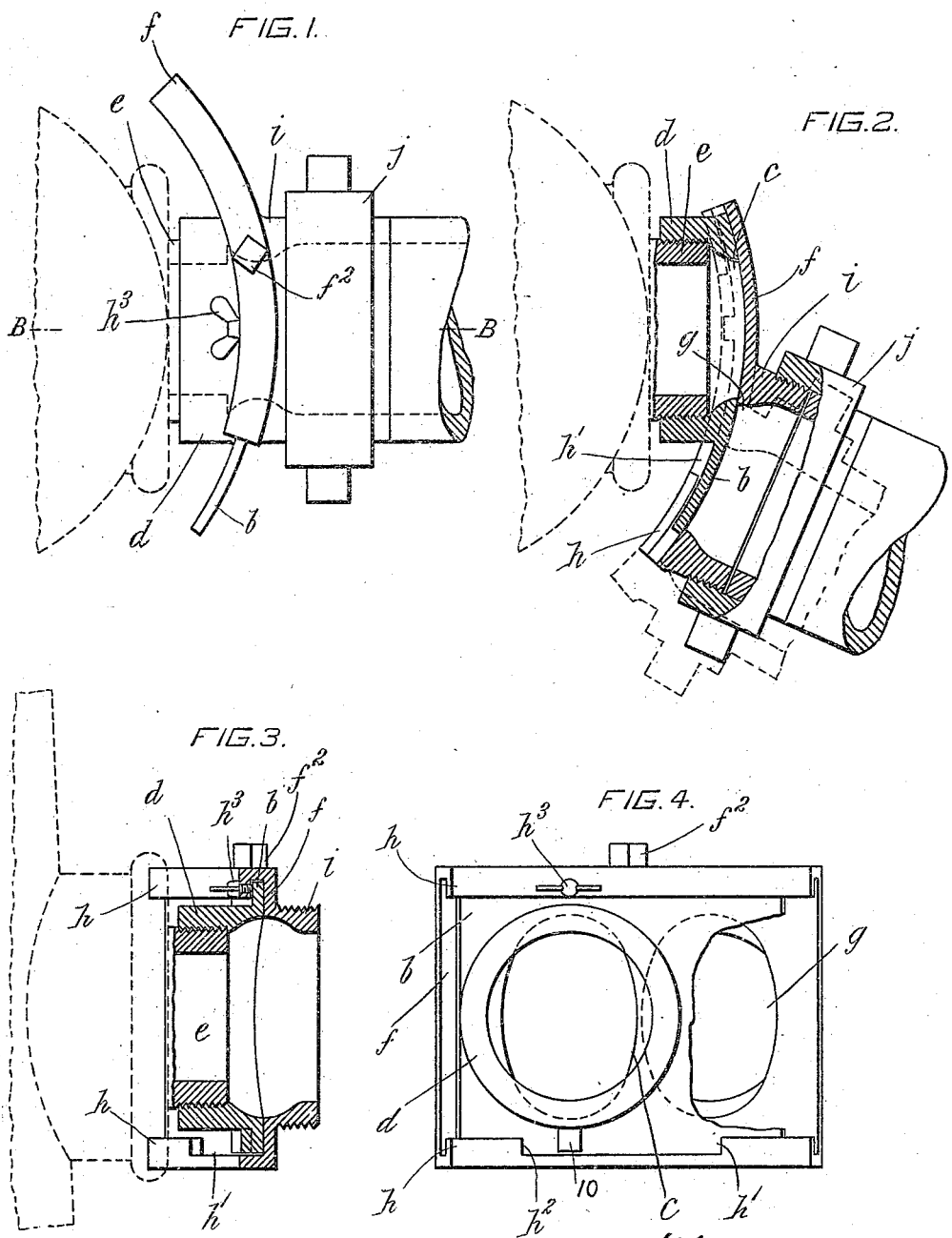

FREDERIC SCOTT SEAGRAVE, OF DETROIT, MICHIGAN.

HYDRANT AND HOSE CUT-OFF VALVE.

961,901.　　　　Specification of Letters Patent.　Patented June 21, 1910.

Application filed October 26, 1905. Serial No. 284,537.

*To all whom it may concern:*

Be it known that I, FREDERIC SCOTT SEAGRAVE, of the city of Detroit, State of Michigan, United States of America, have invented certain new and useful Improvements in Hydrant and Hose Cut-Off Valves; and I do hereby declare that the following is a full, clear, and exact description of the same.

The invention may be said briefly to consist of a cut-off valve comprising a pair of oblong members located in close contact with each other and one slidable lengthwise upon the other, one of such members having a port therein and means permanently carried thereby for coupling the same to a fluid conducting member, and the other having a port therein and means permanently carried thereby for coupling a second fluid conducting member thereto, such ports being adapted to be either in communication with one another or the first mentioned cut off by the valvular member in which the other port is formed according to the relative positions of the said valvular members. These ports are preferably oval and disposed with their smaller diameters in the direction of movement of the slidable member. For full comprehension, however, of my invention reference must be had to the accompanying drawings forming a part of this specification and in which similar reference characters indicate the same parts and wherein—

Figure 1 is a plan view of my improved cut-off valve with a portion of a hydrant shown in dotted lines; Fig. 2 is a horizontal sectional view with the movable member illustrated in full lines in a position cutting off the hose from the hydrant and preventing the drainage of the hose, and, in dotted lines, in a position draining the hose and at the same time fully cutting off the supply from the hydrant; Fig. 3 is a transverse vertical sectional view taken on line B, B, Fig. 1, and Fig. 4 is a rear elevation thereof.

The carrying member of my improved cut-off valve consists preferably of an oblong casting $b$ of plate form with a port $c$ therein and an interiorly screw-threaded sleeve $d$ formed integrally therewith and adapted to be screwed upon the nipple $e$ of a hydrant or such as is usually carried by a hose end. A movable member is carried slidably by this carrying member $b$ and also consists preferably of an oblong casting $f$, of plate form having a port $g$ therein and with its longitudinal edges flanged as at $h$ to overlap the corresponding edges of the carrying plate $b$ and prevent displacement of such movable member at right angles to its length; while an exteriorly screw-threaded sleeve $i$ is cast integrally with the said movable member concentrically to the port therein and projects from the outside thereof. This latter sleeve is adapted to have the hose coupling $j$ usually carried by every hose length, screwed thereon. A projection $f^2$ upon this movable member is for the purpose of enabling the usual hose key or spanner to be fitted thereon to facilitate the movement of such member. The ports $c$ and $g$ are preferably oval at their point of contact and they merge into the circular interiors of the sleeves. Both the carrying plate and the movable plate are made just sufficiently long to provide a portion in each on one side of its port adapted to close the port in the other member when the said plates are in their normal relative positions in which communication betwen the hose and hydrant is cut off. By moving the movable member to a position to cause the ports to register the stream will be turned on, and by a reverse movement it will be cut off, while a slight further movement of the movable member in the same direction will uncover the port therein and allow the contents of the hose to drain out. Both carrying and movable members are preferably curved to partially encircle the fluid conducting member upon which the device is mounted.

The overhanging edges of the flanges $h$ are preferably recessed as at $h'$ to provide a shoulder $h^2$ and the carrying plate preferably bears a stop 10 into contact with which the shoulder $h^2$ comes, thus limiting the movement of the movable member; while the upper flange preferably carries a thumb screw $h^3$ by means of which the members may be caused to bear upon one another with varying degrees of tightness.

My improved cut-off device is adapted for use as a means for controlling the flow from a hydrant to the hose.

If desired the movement of this movable member can be effected by fitting the hose key or spanner to the existing lugs upon the hose coupling, or by grasping the hose end and moving it bodily and the movable member with it, without departing from the spirit of my invention.

What I claim is as follows:—

1. The combination of a fire hydrant having an outlet with a vertically arranged seat, of a valve controlling the outlet and consisting of a short curved plate movable in a curved path concentric to the center line of the said hydrant and following the contour of the hydrant body.

2. The combination of a fire hydrant, having an outlet with a vertically arranged seat, of a valve controlling the outlet and consisting of a short curved plate movable in a curved path concentric to the center line of the said hydrant and following the contour of the hydrant body, such valve being carried by the exterior of the hydrant and including means for coupling a hose length thereto.

3. The combination of a fire hydrant having an exteriorly screw-threaded nipple e adapted to have a valve carrying plate mounted thereon, a valve carrying plate having an interiorly screw-threaded sleeve adapted to be screwed upon the nipple e and such plate presenting a convex side concentric to the center line and following the contour of the hydrant, and a second plate having a concave side conforming to the convex side of the first mentioned plate and having an exteriorly screw-threaded sleeve adapted to have a hose length coupled thereto, the said last mentioned plate having its longitudinal edges flanged to slidably retain the corresponding edges of the first mentioned plate.

In testimony whereof, I have signed my name to this specification, in the presence of two subscribing witnesses.

FREDERIC SCOTT SEAGRAVE.

Witnesses:
WILLIAM P. McFEAT,
FRED J. SEARS.